United States Patent
Kitayama et al.

(10) Patent No.: US 11,955,856 B2
(45) Date of Patent: Apr. 9, 2024

(54) ROTARY ELECTRIC MACHINE HAVING INSULATING STRUCTURE FOR ROTOR POLES

(71) Applicant: TOYOTA JIDOSHA KABUSHIKI KAISHA, Toyota (JP)

(72) Inventors: Takeshi Kitayama, Shizuoka-ken (JP); Hiroyuki Hattori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/950,509

(22) Filed: Sep. 22, 2022

(65) Prior Publication Data

US 2023/0094290 A1 Mar. 30, 2023

(30) Foreign Application Priority Data

Sep. 27, 2021 (JP) .................................. 2021-157056

(51) Int. Cl.
*H02K 3/32* (2006.01)
*H02K 1/24* (2006.01)
*H02K 3/52* (2006.01)

(52) U.S. Cl.
CPC ............. *H02K 3/325* (2013.01); *H02K 1/24* (2013.01); *H02K 3/527* (2013.01)

(58) Field of Classification Search
CPC ............ H02K 1/24; H02K 3/32; H02K 3/325; H02K 3/34; H02K 3/345; H02K 3/52; H02K 3/527
USPC .......................................................... 310/46
See application file for complete search history.

(56) References Cited

U.S. PATENT DOCUMENTS

| | | | | |
|---|---|---|---|---|
| 6,057,621 A | * | 5/2000 | Suzuki | H02K 21/14 310/187 |
| 6,590,312 B1 | * | 7/2003 | Seguchi | B60K 6/40 310/156.01 |
| 2009/0021089 A1 | * | 1/2009 | Nashiki | H02K 21/145 310/46 |
| 2010/0259136 A1 | * | 10/2010 | Hiramoto | H02K 19/28 318/494 |
| 2012/0223600 A1 | * | 9/2012 | Tonogi | H02K 1/148 310/46 |
| 2014/0300223 A1 | * | 10/2014 | Yamada | H02K 11/042 310/54 |
| 2014/0354091 A1 | * | 12/2014 | Yamada | H02K 19/12 310/71 |
| 2015/0155753 A1 | * | 6/2015 | Kubo | H02K 3/487 310/214 |

(Continued)

FOREIGN PATENT DOCUMENTS

JP 2020-162212 A 10/2020

*Primary Examiner* — Rashad H Johnson
(74) *Attorney, Agent, or Firm* — Dinsmore & Shohl LLP

(57) ABSTRACT

A rotary electric machine includes: a stator; and a rotor that face the stator and that rotates together with a rotation shaft, the rotor including: a rotor core including rotor salient poles and a slot formed between adjacent rotor salient poles, and a rotor coil wound around each of the rotor salient poles via an insulating member through the slot. Further, the rotor coil includes: a slot coil portion; and a coil end portion protruding from an end surface of the rotor core in an axial direction, the insulating member includes: a slot insulating portion; and an end insulating portion, and the slot insulating portion and the end insulating portion are integrated.

6 Claims, 3 Drawing Sheets

(56) References Cited

U.S. PATENT DOCUMENTS

| | | | |
|---|---|---|---|
| 2015/0194855 A1* | 7/2015 | Kubo | H02K 3/527 |
| | | | 310/214 |
| 2017/0163112 A1* | 6/2017 | Tokoi | H02K 3/46 |
| 2023/0094290 A1* | 3/2023 | Kitayama | H02K 1/24 |
| | | | 310/46 |

* cited by examiner

RADIAL DIRECTION ns ROTARY ELECTRIC MACHINE HAVING
INSULATING STRUCTURE FOR ROTOR
POLES

CROSS-REFERENCE TO RELATED APPLICATION

The present application claims priority to and incorporates by reference the entire contents of Japanese Patent Application No. 2021-157056 filed in Japan on Sep. 27, 2021.

BACKGROUND

The present disclosure relates to a rotary electric machine.

Japanese Laid-open Patent Publication No. 2020-162212 discloses a winding field rotary electric machine including a rotor that is disposed so as to face a stator and that rotates together with a rotation shaft, the rotor including: a rotor core including a plurality of rotor salient poles and a slot formed between adjacent rotor salient poles; and a rotor coil wound around a salient pole through the slot, in which a field winding is mounted around the salient pole of the rotor core via a pair of insulating winding frames attached on both axial end sides of the rotor coil.

Insulation between a rotor coil and a salient pole of the rotor core is necessary in each of a coil end portion of a rotor coil, which is a field winding, and an inside of a slot. There is room for improvement in securing an insulation property while inhibiting the size of the rotor coil.

SUMMARY

There is a need for providing a rotary electric machine capable of securing the insulation property between a rotor coil and a rotor salient pole with an insulating member while inhibiting the size of the rotor coil.

According to an embodiment, a rotary electric machine includes: a stator; and a rotor that is disposed so as to face the stator and that rotates together with a rotation shaft, the rotor including: a rotor core including a plurality of rotor salient poles and a slot formed between adjacent rotor salient poles; and a rotor coil wound around each of the rotor salient poles via an insulating member through the slot. Further, the rotor coil includes: a slot coil portion located inside the slot; and a coil end portion protruding from an end surface of the rotor core in an axial direction, the insulating member includes: a slot insulating portion provided between the slot coil portion and each of the rotor salient poles in a peripheral direction of the rotor core; and an end insulating portion provided between the coil end portion and each of the rotor salient poles in the axial direction of the rotor core, and the slot insulating portion and the end insulating portion are integrated.

DETAILED DESCRIPTION

An embodiment of a rotary electric machine 1 according to the present disclosure will be described below. Note that the embodiment does not limit the present disclosure.

Figure 1:
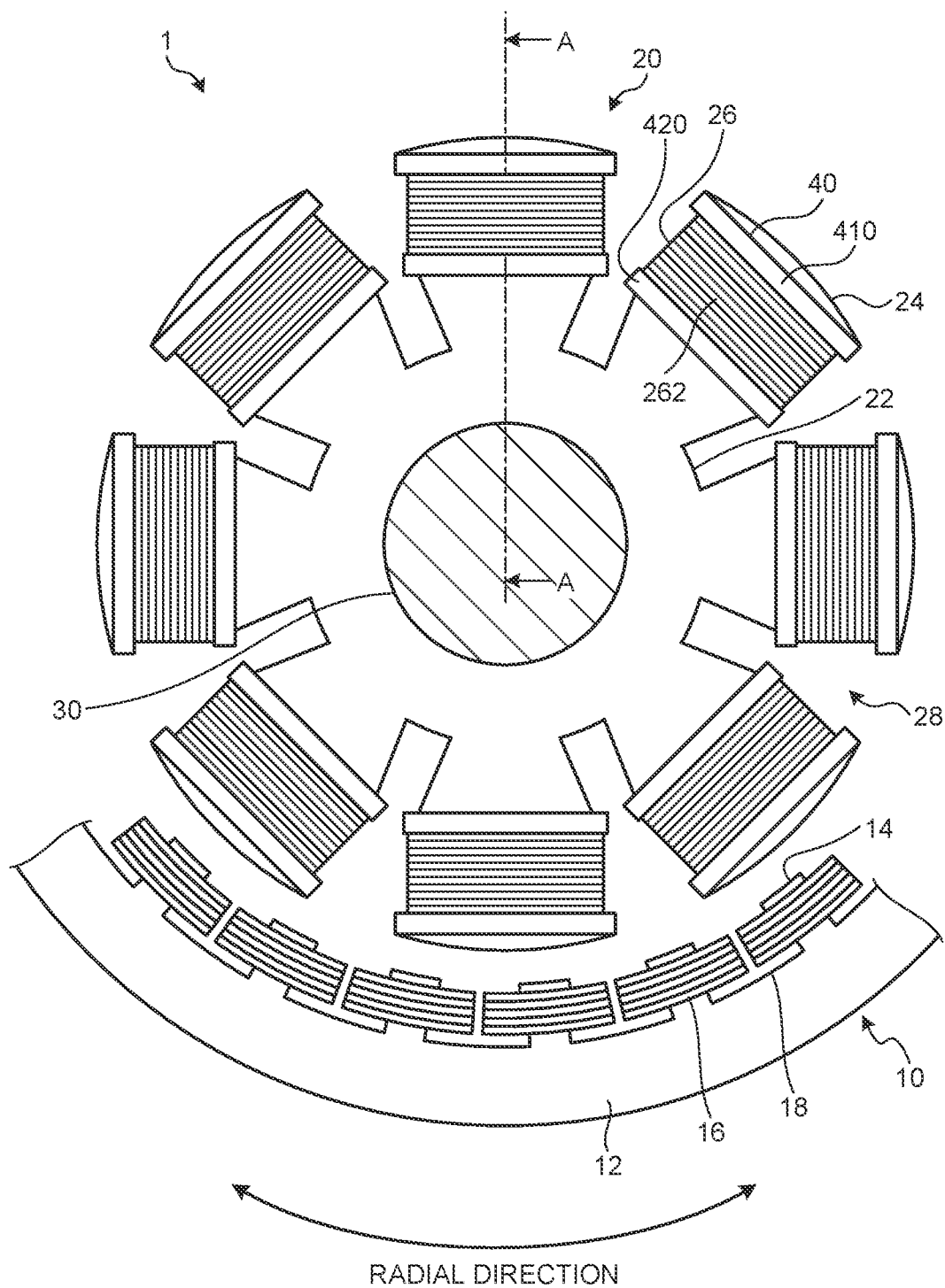
FIG. 1 illustrates a schematic configuration of a rotary electric machine according to an embodiment as viewed from an axial direction.
Figure 2:
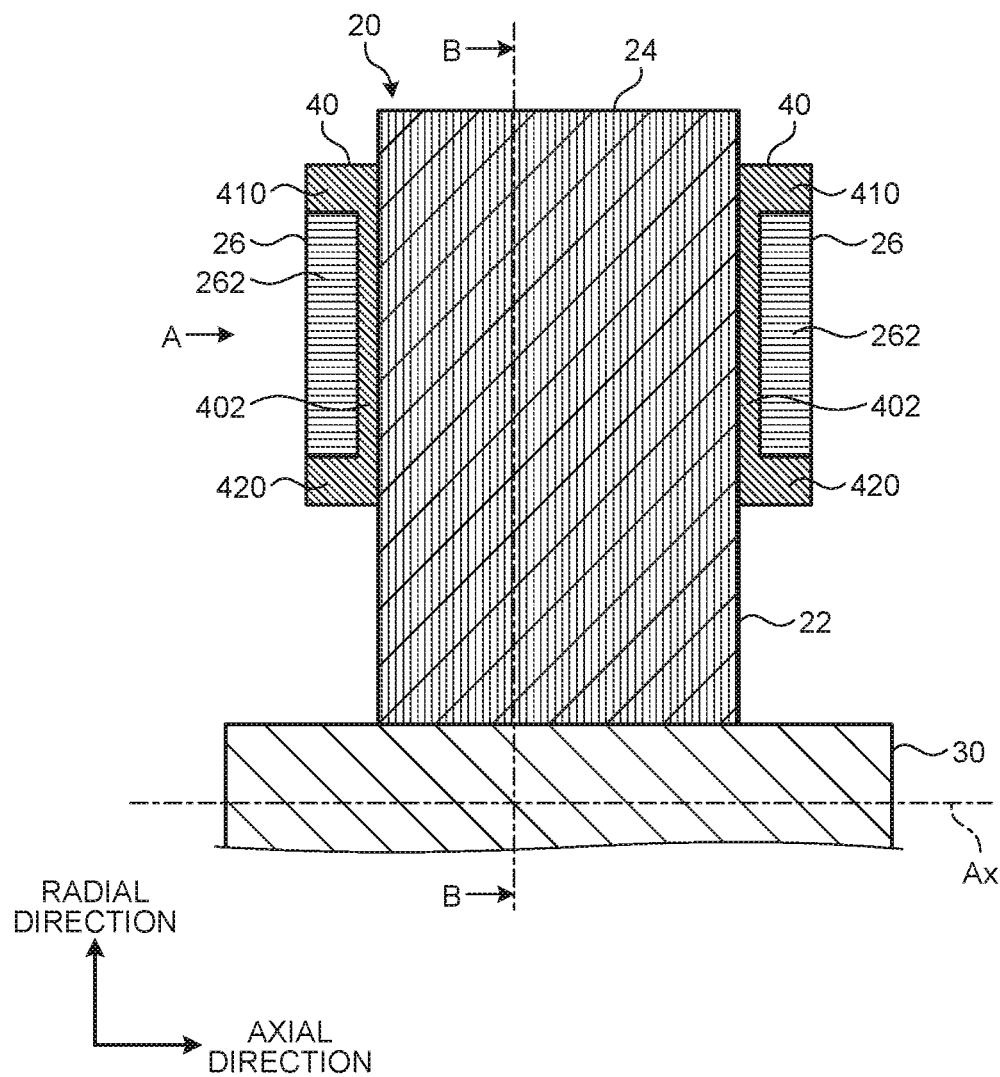
FIG. 2 is an A-A cross-sectional view of a rotor in FIG. 1.
Figure 3:
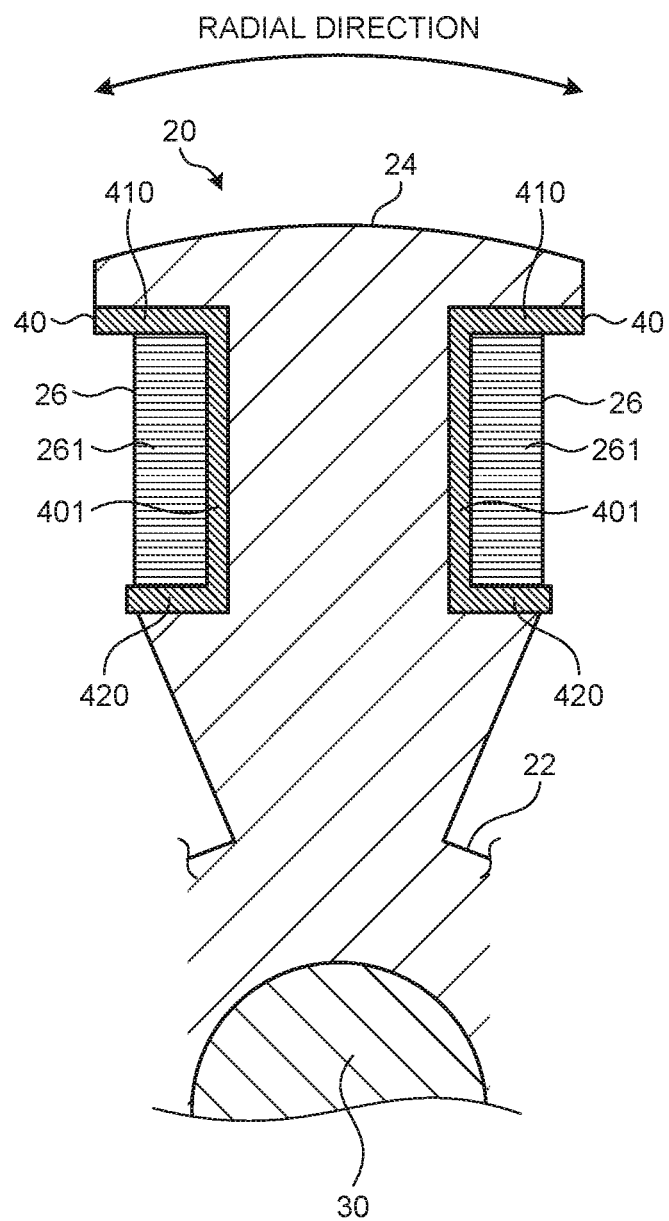
FIG. 3 is a B-B cross-sectional view of the rotor in FIG. 2.

FIG. 1 illustrates a schematic configuration of the rotary electric machine 1 according to the embodiment as viewed from an axial direction. FIG. 2 is an A-A cross-sectional view of a rotor 20 in FIG. 1. FIG. 3 is a B-B cross-sectional view of the rotor 20 in FIG. 2.

The rotary electric machine 1 according to the embodiment is a three-phase synchronous rotary electric machine including a stator 10, the rotor 20, and the like.

The stator 10 includes a stator core 12, a plurality of teeth 14, a stator coil 16, and the like. The teeth 14 are disposed along the peripheral direction of the stator core 12. The stator coil 16 is wound around each of the teeth 14 a plurality of times. Note that, although FIG. 1 illustrates only a part of the stator 10, the stator 10 having an annular shape is provided so as to surround the entire periphery of the rotor 20.

The stator core 12 is an annular magnetic member on the inner peripheral side of which the plurality of teeth 14 is disposed. The stator core 12 as described above is formed by laminating a plurality of electromagnetic steel sheets having a predetermined shape.

The stator coil 16 includes windings of three phases including a U-phase winding, a V-phase winding, and a W-phase winding. Windings of each phase sequentially pass through a slot 18, and are sequentially wound around the predetermined teeth 14 in accordance with a predetermined distribution winding arrangement method. The slot 18 is space between adjacent teeth 14. Windings of the U-phase winding, the V-phase winding, and the W-phase winding of the stator coil 16 wound around the teeth 14 are sequentially disposed along the peripheral direction of the stator core 12 to go around.

The rotor 20 includes a rotor core 22, a plurality of rotor salient poles 24, a rotor coil 26, an insulating member 40, and the like. The plurality of rotor salient poles 24 is disposed along the peripheral direction of the rotor core 22. The rotor coil 26 is wound around a rotor salient pole 24.

The rotor core 22 is an annular magnetic member. The plurality of rotor salient poles 24 is disposed on the outer peripheral side of the rotor core 22. The rotor core 22 has a shaft hole at a central portion. A shaft 30, which is a rotation shaft, is fixed into the shaft hole. The rotor core 22 as described above is formed by laminating a plurality of electromagnetic steel sheets having a predetermined shape.

The rotor coil 26 is a field winding wound around the rotor salient pole 24 via the insulating member 40. The rotor coil 26 passes through a slot 28 formed between adjacent rotor salient poles 24, and is wound around the rotor salient pole 24 predetermined number of times of winding. Furthermore, the rotor coil 26 is wound around the rotor salient pole 24 in a state of protruding from the rotor core 22 to both axial sides. The rotor coil 26 includes a slot coil portion 261 and a coil end portion 262. The slot coil portion 261 is located inside the slot 28. The coil end portion 262 axially protrudes outward from the rotor core 22. Note that, in the embodiment, the "axial direction" refers to a direction in which an axis Ax of the shaft 30 extends (longitudinal direction of shaft 30).

The insulating member 40 includes a slot insulating portion 401 and an end insulating portion 402. The slot insulating portion 401 is provided between the slot coil portion 261 and the rotor salient pole 24 (rotor core 22) in the peripheral direction of the rotor core 22. The end insulating portion 402 is provided between the coil end portion 262 and the rotor salient pole 24 (rotor core 22) in the axial direction of the rotor core 22. Then, the slot insulating portion 401 and the end insulating portion 402 are integrally molded.

Here, for example, when the slot insulating portion 401 and the end insulating portion 402 are separately provided in the insulating member 40, a gap is formed in the joint between the slot insulating portion 401 and the end insulating portion 402, which may deteriorate the insulation property. Furthermore, when the slot insulating portion 401 and the end insulating portion 402 are overlapped to prevent the gap from being formed at the joint portion between the slot insulating portion 401 and the end insulating portion 402, the size of the rotor coil 26 is larger at a portion where the rotor coil 26 is wound around the rotor salient pole 24 via an overlapped portion between the slot insulating portion 401 and the end insulating portion 402 than at a portion where the rotor coil 26 is wound around the rotor salient pole 24 via only the slot insulating portion 401 or only the end insulating portion 402. In contrast, if the number of times of winding of the rotor coil 26 to the rotor salient pole 24 is reduced to prevent the size of the rotor coil 26 at the portion where the rotor coil 26 is wound around the rotor salient pole 24 via the overlapped portion between the slot insulating portion 401 and the end insulating portion 402 from being increased, torque may be reduced.

In contrast, in the rotary electric machine 1 according to the embodiment, the slot insulating portion 401 and the end insulating portion 402 of the insulating member 40 are integrally molded, and thus there is no overlap and no joint between the slot insulating portion 401 and the end insulating portion 402. Therefore, in the rotary electric machine 1 according to the embodiment, the insulation property between the rotor coil 26 and the rotor salient pole 24 (rotor core 22) can be secured by the insulating member 40 while the size of the rotor coil 26 is inhibited.

Furthermore, the slot insulating portion 401 and the end insulating portion 402 of the insulating member 40 includes a first flange-shaped portion 410 and a second flange-shaped portion 420. The first flange-shaped portion 410 is provided adjacent to the slot coil portion 261 and the coil end portion 262 on the radially outer side of the slot coil portion 261 and the coil end portion 262. The second flange-shaped portion 420 is provided adjacent to the slot coil portion 261 and the coil end portion 262 on the radially inner side of the slot coil portion 261 and the coil end portion 262. Then, the first flange-shaped portion 410 and the second flange-shaped portion 420 are integrally molded with the slot insulating portion 401 and the end insulating portion 402, respectively. This allows the first flange-shaped portion 410 and the second flange-shaped portion 420 to secure the insulation property between the slot insulating portion 401 and the coil end portion 262 and the rotor salient pole 24 (rotor core 22) in the radial direction of the rotor 20.

Furthermore, in the rotary electric machine 1 according to the embodiment, the first flange-shaped portion 410 is provided adjacent to the slot coil portion 261 and the coil end portion 262 on the radially outer side of the slot coil portion 261 and the coil end portion 262. Thus, even if centrifugal force toward the radially outer side is applied to the slot coil portion 261 and the coil end portion 262 at the time of rotation of the rotor 20, the slot coil portion 261 and the coil end portion 262 come into contact with the first flange-shaped portion 410, and movement to the radially outer side is restricted. This can inhibit occurrence of positional deviation of the rotor coil 26 due to centrifugal force at the time of rotation of the rotor 20. In particular, since the coil end portion 262 protrudes to the axially outer side from the rotor salient pole 24 (rotor core 22), the first flange-shaped portion 410 can effectively inhibit the positional deviation of the coil end portion 262 due to centrifugal force.

A rotary electric machine according to an embodiment has an effect of securing the insulation property between a rotor coil and a rotor salient pole with an insulating member while inhibiting the size of the rotor coil since a slot insulating portion and an end insulating portion of an insulating member are integrated, and thus there is no overlap and no joint between the slot insulating portion and the end insulating portion.

In a rotary electric machine according to an embodiment, a slot insulating portion and an end insulating portion of an insulating member are integrated, and thus there is no overlap and no joint between the slot insulating portion and the end insulating portion. The insulation property between a rotor coil and a rotor salient pole can be secured by an insulating member while the size of the rotor coil is inhibited.

According to an embodiment, the insulation property between a coil end portion and the rotor salient pole on the radially outer side of a rotor can be secured by a first flange-shaped portion while positional deviation at the coil end portion caused by centrifugal force at the time of rotation of the rotor can be inhibited.

According to an embodiment, the insulation property between the coil end portion and the rotor salient pole on the radially inner side of the rotor can be secured by a second flange-shaped portion.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A rotary electric machine comprising
   a stator; and
   a rotor that is disposed so as to face the stator and that rotates together with a rotation shaft, the rotor including:
      a rotor core including a plurality of rotor salient poles and a slot formed between adjacent rotor salient poles; and
      a rotor coil wound around each of the rotor salient poles via an insulating member through the slot, the rotor coil includes:
      a slot coil portion located inside the slot; and
      a coil end portion protruding from an end surface of the rotor core in an axial direction,
   wherein the insulating member includes:
      a slot insulating portion provided between the slot coil portion and each of the rotor salient poles in a peripheral direction of the rotor core; and an end insulating portion provided between the coil end portion and each of the rotor salient poles in the axial direction of the rotor core, and the slot insulating portion and the end insulating portion are integrated; and
      a first flange-shaped portion integrated with the slot insulating portion, the first flange-shaped portion being provided on an outer side of the coil end portion in the peripheral direction of the rotor core, the first flange-shaped portion is provided between the rotor salient pole and the slot coil portion.

2. The rotary electric machine according to claim 1, wherein the insulating member includes a second flange-shaped portion integrated with the end insulating portion, the second flange-shaped portion being provided on a radially inner side of the coil end portion.

3. A rotary electric machine comprising
a stator; and
a rotor that is disposed so as to face the stator and that rotates together with a rotation shaft, the rotor including:
   a rotor core including a plurality of rotor salient poles and a slot formed between adjacent rotor salient poles; and
   a rotor coil wound around each of the rotor salient poles via an insulating member through the slot, the rotor coil includes:
   a slot coil portion located inside the slot; and
   a coil end portion protruding from an end surface of the rotor core in an axial direction,
wherein the insulating member includes:
   a slot insulating portion provided between the slot coil portion and each of the rotor salient poles in a peripheral direction of the rotor core; and an end insulating portion provided between the coil end portion and each of the rotor salient poles in the axial direction of the rotor core, and the slot insulating portion and the end insulating portion are integrated; and
   a first flange-shaped portion integrated with the slot insulating portion, the first flange-shaped portion being provided on an outer side of the coil end portion in the peripheral direction of the rotor core, the first flange-shaped portion is provided between the rotor salient pole and the slot coil portion,
   the first flange-shaped portion extends beyond the slot coil portion in a radial direction of the rotor.

4. The rotary electric machine according to claim 3, wherein the insulating member includes a second flange-shaped portion integrated with the end insulating portion, the second flange-shaped portion being provided on a radially inner side of the coil end portion.

5. A rotary electric machine comprising
a stator; and
a rotor that is disposed so as to face the stator and that rotates together with a rotation shaft, the rotor including:
   a rotor core including a plurality of rotor salient poles and a slot formed between adjacent rotor salient poles; and
   a rotor coil wound around each of the rotor salient poles via an insulating member through the slot, the rotor coil includes:
   a slot coil portion located inside the slot; and
   a coil end portion protruding from an end surface of the rotor core in an axial direction,
wherein the insulating member includes:
   a slot insulating portion provided between the slot coil portion and each of the rotor salient poles in a peripheral direction of the rotor core; and an end insulating portion provided between the coil end portion and each of the rotor salient poles in the axial direction of the rotor core, and the slot insulating portion and the end insulating portion are integrated; and
   a first flange-shaped portion integrated with the slot insulating portion, the first flange-shaped portion being provided on an outer side of the coil end portion in the peripheral direction of the rotor core, the first flange-shaped portion is provided between the rotor salient pole and the slot coil portion,
   the first flange-shaped portion includes an outer surface that faces an inner surface of the rotor salient poles, the inner surface of the rotor salient poles entirely faces the rotation shaft in the peripheral direction of the rotor core.

6. The rotary electric machine according to claim 5, wherein the insulating member includes a second flange-shaped portion integrated with the end insulating portion, the second flange-shaped portion being provided on a radially inner side of the coil end portion.

* * * * *